(12) United States Patent
Lin et al.

(10) Patent No.: US 8,208,062 B2
(45) Date of Patent: Jun. 26, 2012

(54) CAMERA MODULE AND PORTABLE ELECTRONIC DEVICE HAVING SAME

(75) Inventors: Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 357 days.

(21) Appl. No.: 12/502,393

(22) Filed: Jul. 14, 2009

(65) Prior Publication Data

US 2010/0149388 A1 Jun. 17, 2010

(30) Foreign Application Priority Data

Dec. 17, 2008 (CN) .......................... 2008 1 0306323

(51) Int. Cl.
*H04N 5/225* (2006.01)
(52) U.S. Cl. ..................... 348/374; 348/373; 396/535
(58) Field of Classification Search .................. 348/374
See application file for complete search history.

(56) References Cited

U.S. PATENT DOCUMENTS

| | | | | |
|---|---|---|---|---|
| 5,883,663 A * | 3/1999 | Siwko | ............................. | 348/87 |
| 2003/0016214 A1* | 1/2003 | Sukeno et al. | ................ | 345/207 |
| 2003/0036365 A1* | 2/2003 | Kuroda | ........................... | 455/90 |
| 2003/0117501 A1* | 6/2003 | Shirakawa | ................. | 348/218.1 |
| 2005/0046740 A1* | 3/2005 | Davis | ............................ | 348/373 |
| 2005/0047773 A1* | 3/2005 | Satake et al. | ................... | 396/301 |
| 2007/0269205 A1* | 11/2007 | Lee et al. | ........................ | 396/542 |
| 2008/0088734 A1* | 4/2008 | Huang | ........................... | 348/374 |
| 2008/0095526 A1* | 4/2008 | Chang | ........................... | 396/429 |
| 2009/0017867 A1* | 1/2009 | Koh | ............................. | 455/556.1 |
| 2009/0091651 A1* | 4/2009 | Artsiely | ......................... | 348/340 |
| 2010/0231779 A1* | 9/2010 | Lin et al. | ....................... | 348/335 |

FOREIGN PATENT DOCUMENTS

| CN | 1538715 A | | 10/2004 |
|---|---|---|---|
| CN | 101075074 A | | 11/2007 |
| JP | 10179516 A | * | 7/1998 |
| JP | 2006091598 A | * | 4/2006 |

* cited by examiner

*Primary Examiner* — Sinh Tran
*Assistant Examiner* — Paul Berardesca
(74) *Attorney, Agent, or Firm* — Altis Law Group, Inc.

(57) ABSTRACT

An exemplary camera module includes a barrel, first and second lens assemblies, a circuit board, first and second image sensors. The barrel includes a first inner space, a first light incident opening in communication with the first inner space, a second inner space and a second light incident opening in communication with the second inner space. The first and second lens assemblies are received in the first inner space and second inner space, respectively. The circuit board is positioned between the first inner space and the second inner space, and has a first surface and an opposite second surface. The first image senor is mounted on the first surface of the circuit board, and configured for detecting light from the first lens assembly. The second image sensor is mounted on the second surface of the circuit board, and configured for detecting light from the second lens assembly.

6 Claims, 8 Drawing Sheets

CAMERA MODULE AND PORTABLE ELECTRONIC DEVICE HAVING SAME

BACKGROUND

1. Technical Field

The present disclosure relates to camera modules, and particularly, to a camera module having selectable lens assemblies, and a portable electronic device having same.

2. Description of Related Art

Currently, camera modules are widely applied in a variety of portable electronic devices such as mobilephones and notebooks. Such camera modules are also required to have a multi-function such as selectable lens assemblies.

However, as the camera modules are mounted within the enclosure of the portable electronic devices, thus to change the lens assembly of the camera module is difficult.

What is needed, therefore, is a camera module and a portable electronic device, which can overcome the above shortcoming.

BRIEF DESCRIPTION OF THE DRAWINGS

Many aspects of the camera module and portable electronic device can be better understood with reference to the following drawings. The components in the drawings are not necessarily drawn to scale, the emphasis instead being placed upon clearly illustrating the principles of the present camera module and portable electronic device. Moreover, in the drawings, like reference numerals designate corresponding parts throughout the several views.

DETAILED DESCRIPTION OF THE EMBODIMENTS

Embodiments of the present camera module and portable electronic device will now be described in detail below and with reference to the drawings.

Figure 1:
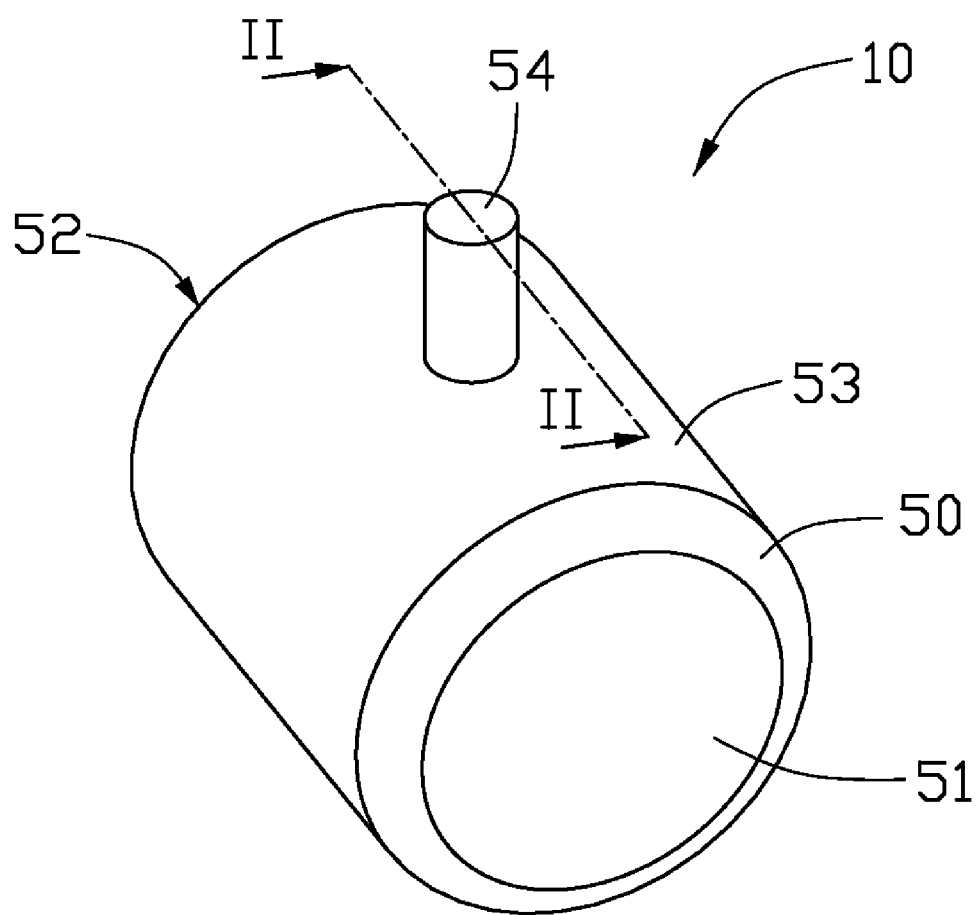
FIG. 1 is a schematic, isometric view of a camera module in accordance with an exemplary embodiment.
Figure 2:
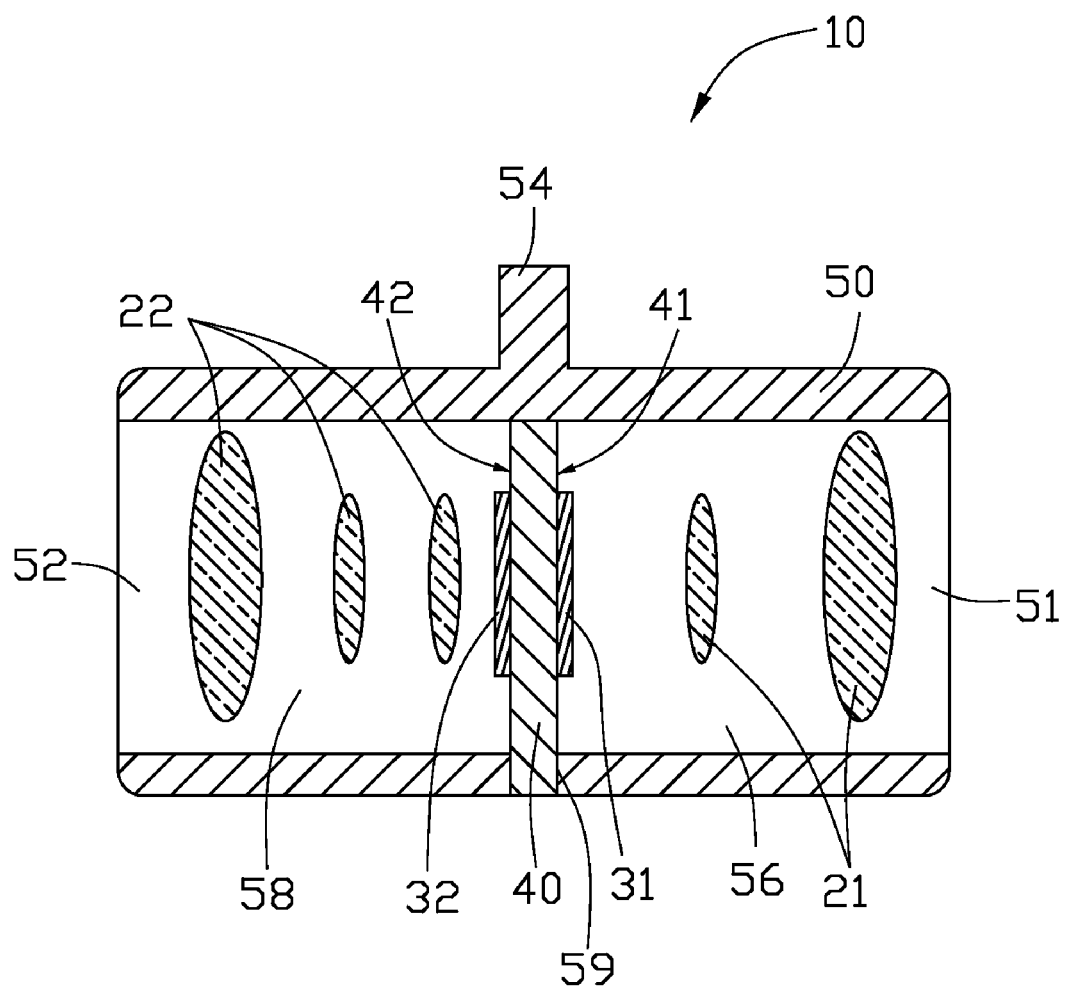
FIG. 2 is a cross-sectional view of the camera module of FIG. 1, taken along line II-II.

Referring to FIGS. 1 and 2, an exemplary camera module 10 is provided. The camera module 10 includes a barrel 50, a first lens assembly 21, a second lens assembly 22, a circuit board 40, a first image senor 31 and a second image senor 32.

The barrel 50 is cylindrical shaped, and has a shaft 54 formed on an outer wall 53 thereof. The shaft 54 is substantially located at a central region of barrel 50, and configured for positioning the camera module 10 in a portable electronic device. The barrel 50 includes a first inner space 56, a first light incident opening 51 in communication with the first inner space 56, a second inner space 58 and a second light incident opening 52 in communication with the second inner space 58. The first light incident opening 51 and the second incident opening 52 are arranged on a same line, i.e., are aligned with each other. The first lens assembly 21 is received in the first inner space 56, and receives light from the first light incident opening 51. The second lens assembly 22 is received in the second inner space 58, and receives light from the second light incident opening 52. The first lens assembly 21 and second lens assembly 22 can have different functions, for example, the first lens assembly 21 can have wide-angle function, and the second lens assembly 22 can have telephoto function.

The circuit board 40 is located between the first inner space 56 and the second inner space 58, and has a first surface 41 facing toward the first inner space 56 and an opposite second surface 42 facing toward the second inner space 58. Sidewall of the circuit board 40 is in contact with an inner wall (not labeled) of the barrel 50. Preferably, a through hole 59 is formed between the inner wall and the outer wall 53 for facilitating the circuit board 40 electrically connecting to an outside device.

The first image senor 31 is mounted on the first surface 41 of the circuit board 40, and is configured for detecting light from the first lens assembly 21. The second image senor 32 is mounted on the second surface 42 of the circuit board 40, and is configured for detecting light from the second lens assembly 22.

Due to the two light incident openings 51, 52, and the two image sensors 31, 32, the lens assemblies 21, 22 can function independently. As such, the lens assemblies 21, 22 are selectable according to need.

Figure 3:
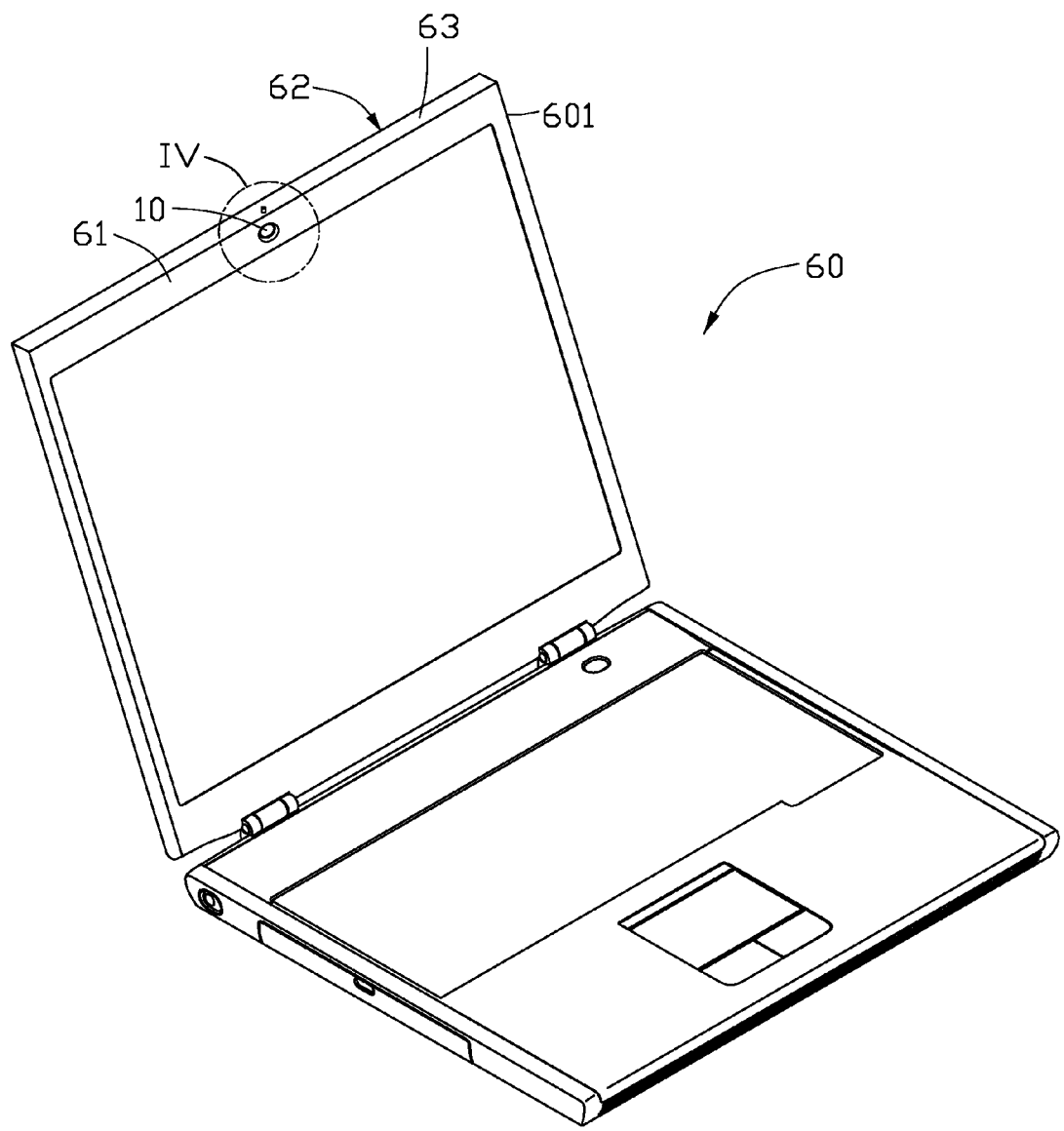
FIG. 3 is a schematic, isometric view of a portable electronic device in accordance with a first embodiment.
Figure 4:
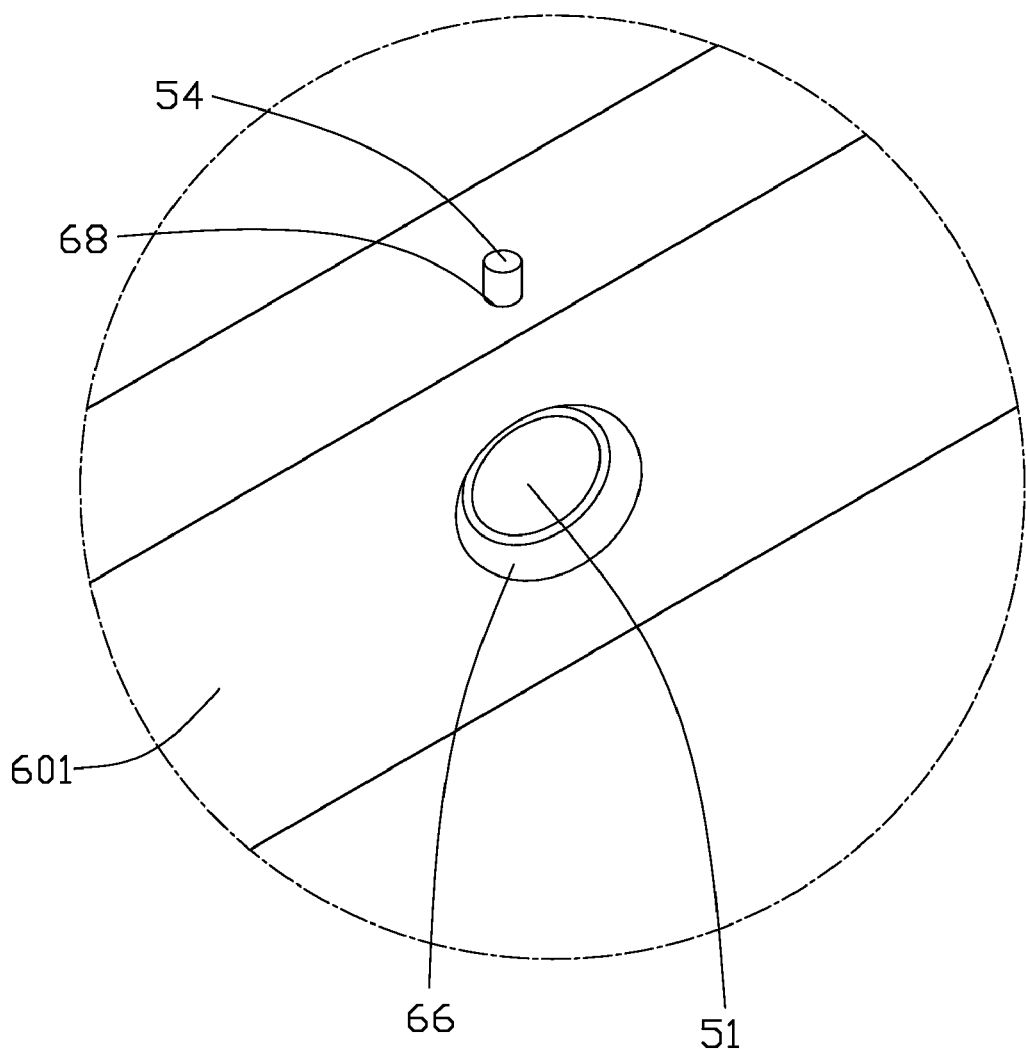
FIG. 4 is an enlarged view the part IV of the portable electronic device of FIG 3.

Referring to FIGS. 3 and 4, an exemplary portable electronic device 60 in accordance with a first embodiment, is provided. The portable electronic device 60 is a notebook, and has a frame 601 configured as an enclosure thereof. The frame 601 has a receiving space (not labeled) receiving the camera module 10 therein. The frame 601 has a front surface 61, a back surface 62 and a top surface 63. The front surface 61 and the back surface 62 each have a viewing window 66, and the viewing windows 66 are arranged in a same line. The top surface 63 has a hole 68 defined therein. The first light incident opening 51 and the second light incident opening 52 (not shown) faces the viewing windows 66, respectively. The shaft 54 extends through and is engaged in the hole 68, such that the camera module 10 is positioned in the frame 601. Preferably, the shaft 54 is rotatably engaged in the hole 68, such that the position of the camera module 10 in the frame 601 can be adjusted. Furthermore, upon a condition that the receiving space in the frame 601 is large enough, the two lens assemblies 21, 22 of the camera module 10 can switch places with each other in the frame 601 by rotating 180 degrees of shaft 54 to face the viewing windows 66.

Figure 5:
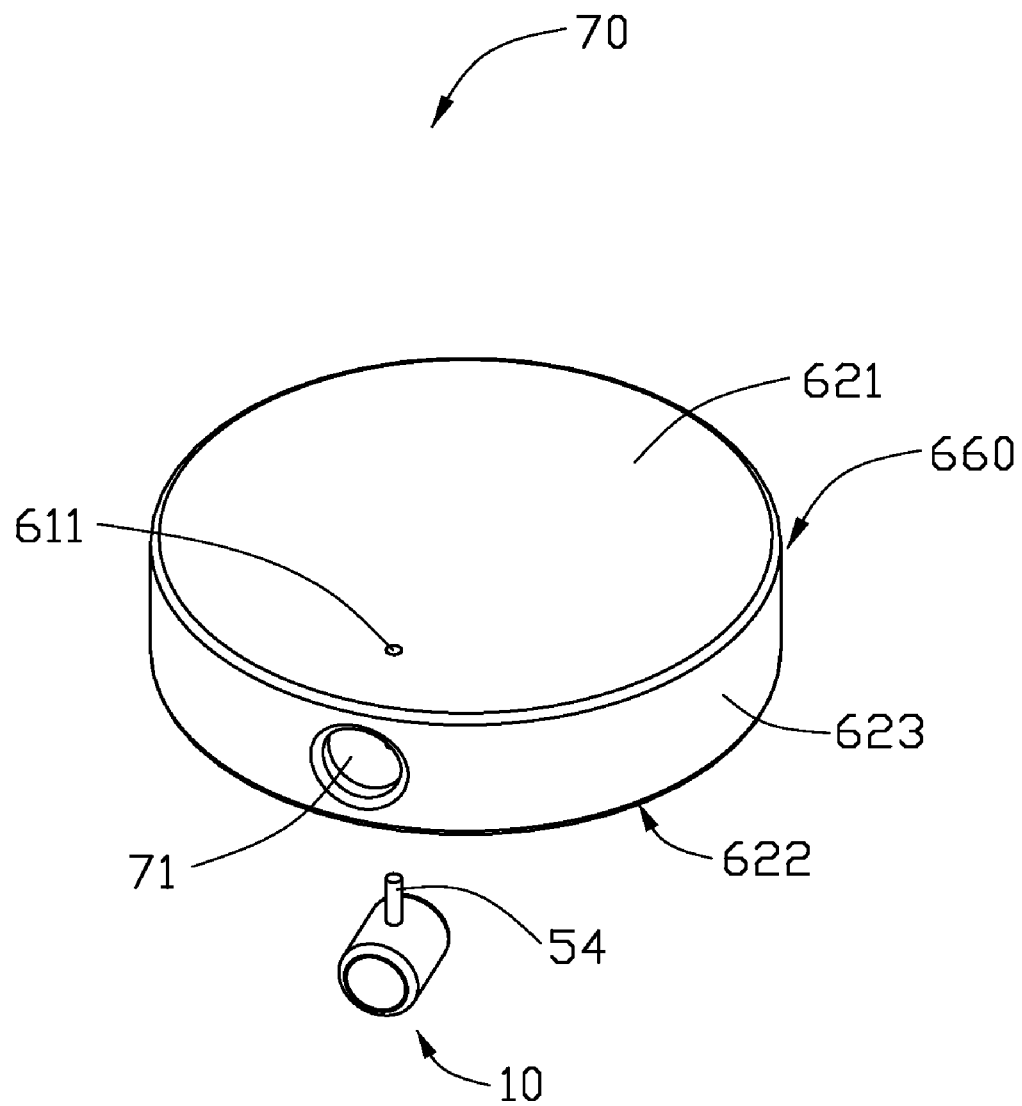
FIG. 5 is a schematic, isometric view of a portable electronic device in accordance with a second embodiment.

Referring to FIG. 5, an exemplary portable electronic device 70 in accordance with a second embodiment, is provided. The portable electronic device 70 has a enclosure 660. The top surface 621, bottom surface 622 and side surface 623 cooperatively form a receiving space (not labeled) therein. The side surface 623 has only one viewing window 71 in communication with the receiving space. The top surface 621 has a hole 611 define therein. The camera module 10 is movably received in the receiving space, and the shaft 54 is rotatably received in the hole 611, such that the two lens assemblies 21, 22 of the camera module 10 can be selected to face the viewing window 70 by rotation of the shaft 54.

Figure 6:
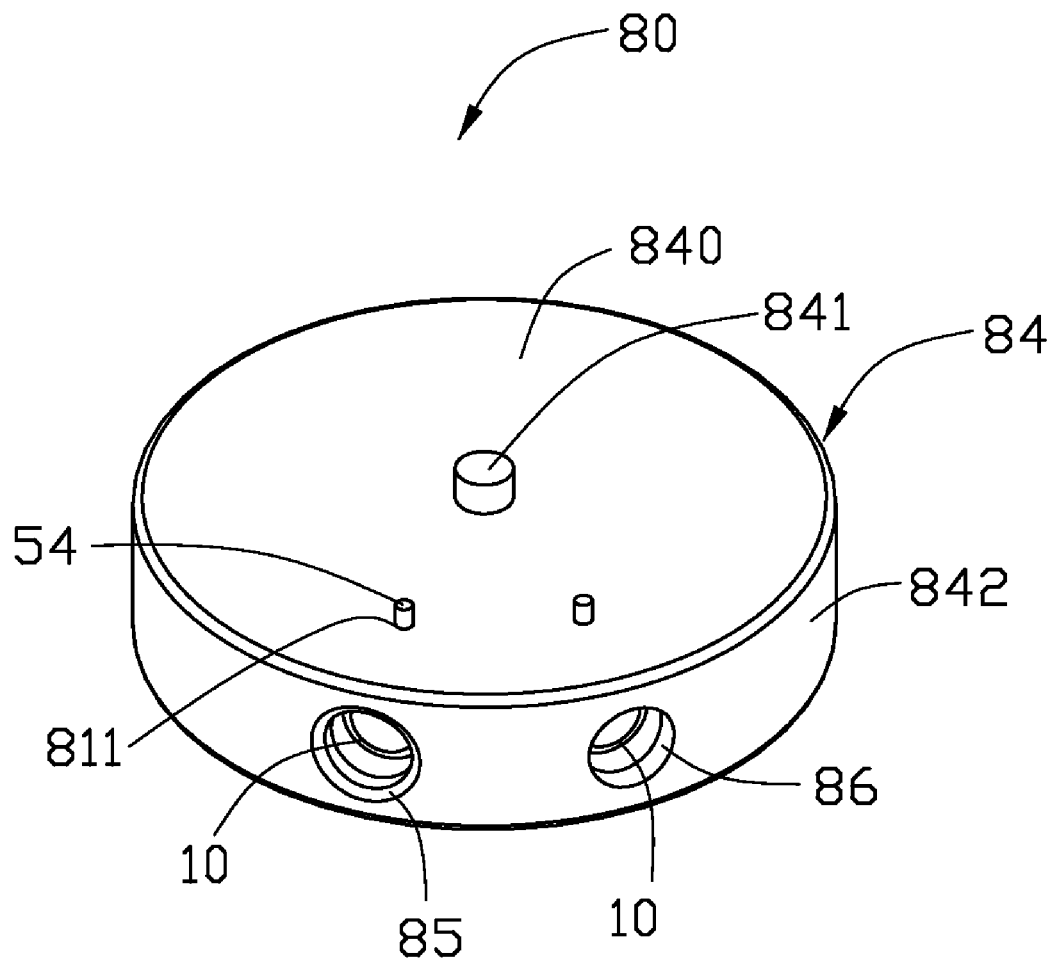
FIG. 6 is a schematic, isometric view of a portable electronic device in accordance with a third embodiment.

Referring to FIG. 6, an exemplary portable electronic device 80 in accordance with a third embodiment, is provided. The portable electronic device 80 having a first enclosure which is essentially similar to the portable electronic device 70 illustrated above, however, a curved side surface 842 of the first enclosure 84 has two first viewing windows 85, 86, a top surface 840 has two holes 811 formed therein, and a pole 841 formed thereon. Two camera modules 10 are movably received in the first enclosure 84, with the shafts 54 rotatably engaged in the holes 811 respectively. The two lens assemblies of each of the camera modules 10 can be selected to face the viewing first windows 85, 86 by rotating 180 degrees of the shafts 54. The entire portable electronic device 80 can be rotated any degree by rotation of the pole 841.

Figure 7:
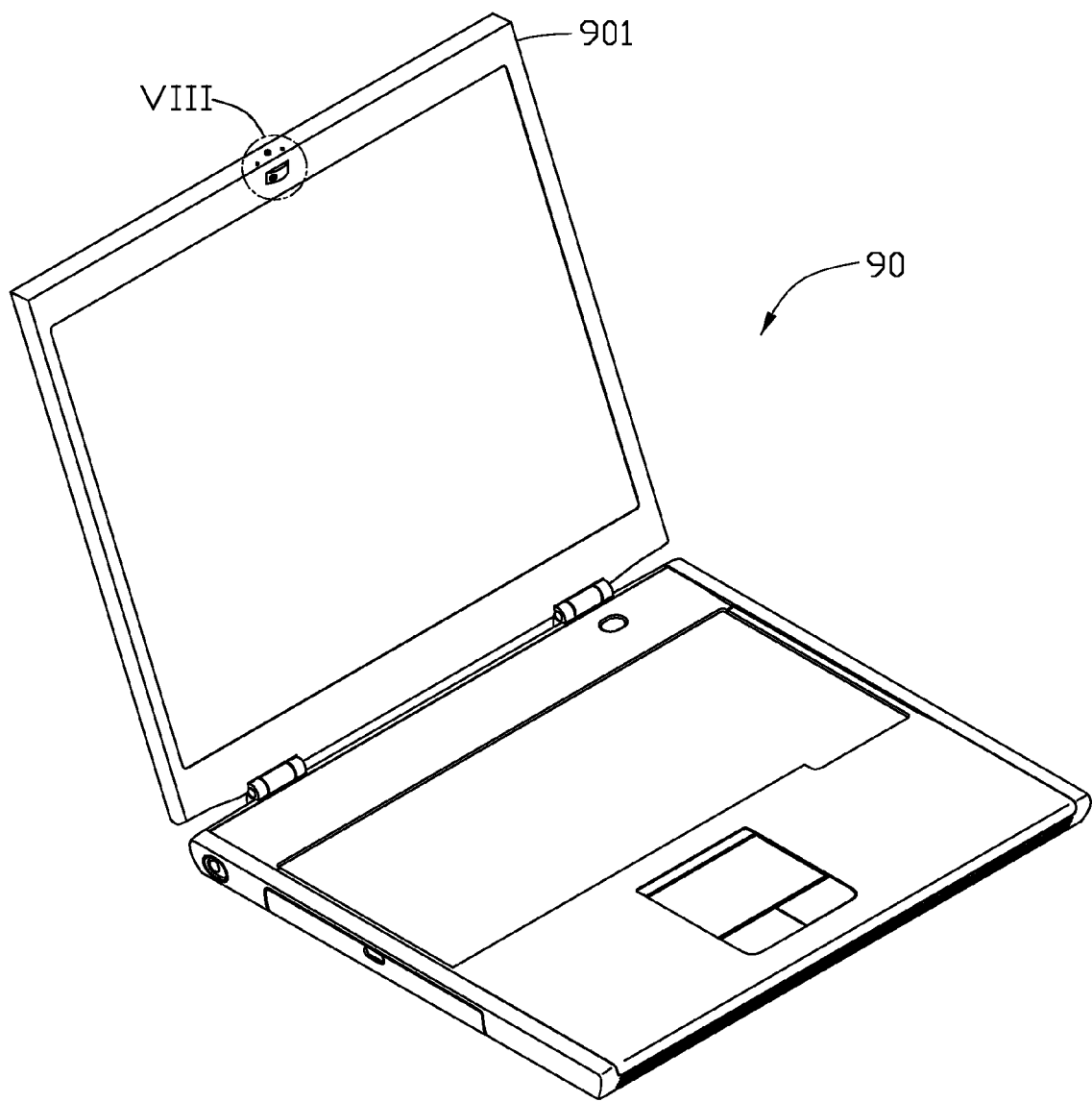
FIG. 7 is a schematic, isometric view of a portable electronic device in accordance with a fourth embodiment.
Figure 8:
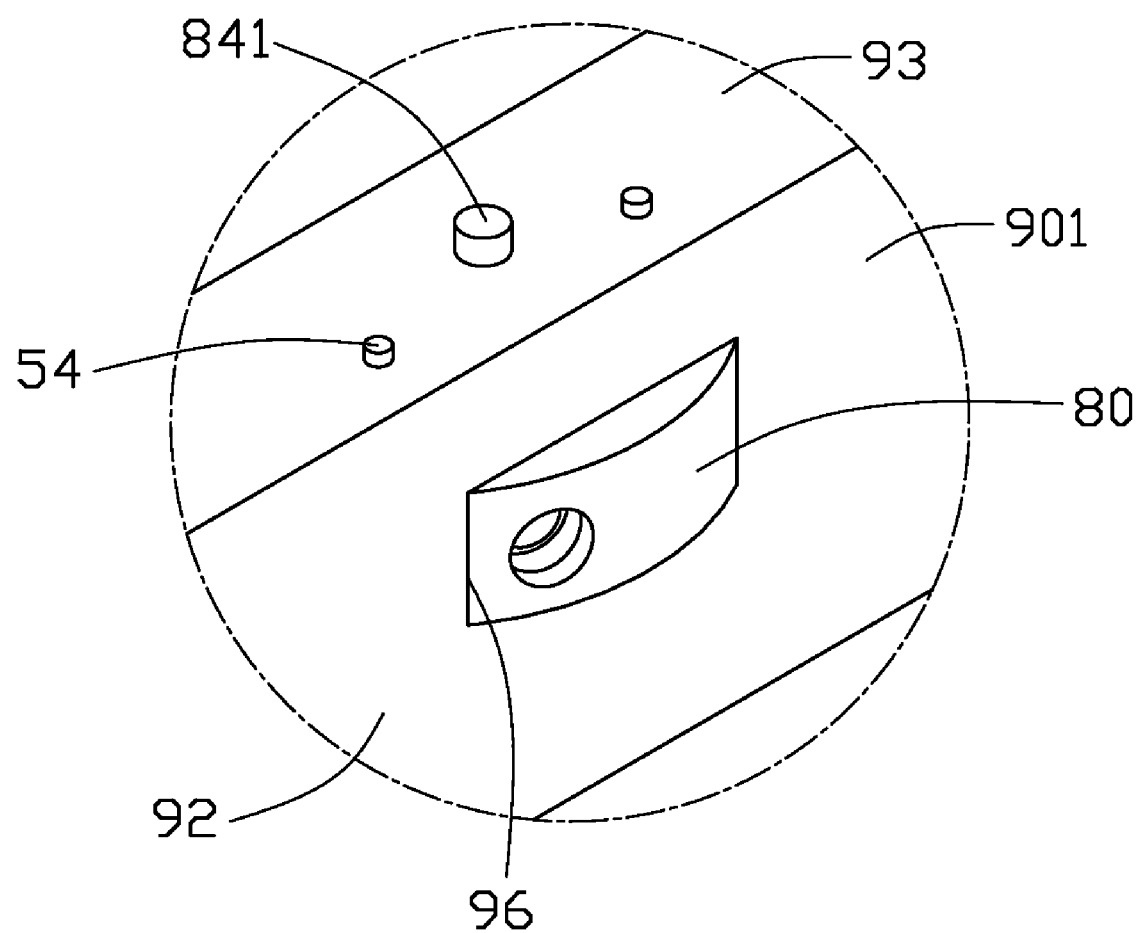
FIG. 8 is an enlarged view the part VIII of the portable electronic device of FIG. 7.

Referring to FIGS. 7 and 8, an exemplary portable electronic device 90 in accordance with a fourth embodiment, is provided. The portable electronic device 90 is also a notebook, however, there is only one second viewing window 96 formed in the front surface 92 of the second enclosure 901, and the portable electronic device 80 (see also FIG. 6) is received in the second enclosure 901. The pole 841 and shafts 54 extend through the top surface 93 of the second enclosure 901 and are rotatably engaged therein. The lens assemblies of the camera modules in the portable electronic device 80 can be selected to face toward the second viewing window 96 by rotation of the pole 841 and the shafts 54.

It is understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claim is:

1. A portable electronic device, comprising:
    two camera modules, each camera module comprising:
        a barrel comprising a first inner space, a first light incident opening communicated with the first inner space, a second inner space, a second light incident opening communicated with the second inner space and a shaft formed on an outer wall thereof;
        a first lens assembly positioned in the first inner space and receiving light from the first light incident opening;
        a second lens assembly positioned in the second inner space and receiving light from the second light incident opening;
        a circuit board positioned between the first inner space and the second inner space, and having a first surface facing toward the first inner space and an opposite second surface facing toward the second inner space;
        a first image sensor mounted on the first surface of the circuit board, and configured for detecting light from the first lens assembly; and
        a second image sensor mounted on the second surface of the circuit board, and configured for detecting light from the second lens assembly;
    a first enclosure having a receiving space movably receiving the two camera modules therein, a top surface, two positioning holes defined in the top surface, a pole formed on the top surface, and two first viewing windows communicating with the receiving space and outside, the shafts extending through the positioning holes and being rotatably engaged in the positioning holes, the shafts having portions exposed at the top surface of the first enclosure, the two camera modules respectively facing toward the two first viewing windows; and
    a second enclosure enclosing the first enclosure, the pole and said portions of the shafts extending through a top surface of the second enclosure, the second enclosure comprising a second viewing window, each of the two first viewing windows being selectively exposable through the second viewing window by rotation of the pole.

2. The portable electronic device of claim 1, wherein the first enclosure comprises a curved side surface, and the two first viewing windows are exposable at the curved side surface.

3. The portable electronic device of claim 1, wherein the first and second light incident openings are aligned with each other.

4. The portable electronic device of claim 1, wherein the shaft is located at a central region of the barrel.

5. The portable electronic device of claim 1, wherein the barrel further comprises a through hole defined in a peripheral sidewall thereof, for allowing the circuit board to be electrically connected to an outside device.

6. The portable electronic device of claim 1, being a notebook computer.

* * * * *